(12) United States Patent  (10) Patent No.: US 9,215,191 B2
Yamashita  (45) Date of Patent: Dec. 15, 2015

(54) INFORMATION PROCESSING METHOD, RECORDING MEDIUM, AND INFORMATION PROCESSING DEVICE

(71) Applicant: FUJITSU LIMITED, Kawasaki-shi, Kanagawa (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 238 days.

(21) Appl. No.: 13/966,713

(22) Filed: Aug. 14, 2013

(65) Prior Publication Data

US 2014/0143426 A1  May 22, 2014

(30) Foreign Application Priority Data

Nov. 21, 2012  (JP) .................................. 2012-255286

(51) Int. Cl.
  *G06F 15/173*  (2006.01)
  *H04L 12/911*  (2013.01)
  *G06F 9/50*  (2006.01)

(52) U.S. Cl.
  CPC .............. *H04L 47/78* (2013.01); *G06F 9/5088* (2013.01); *G06F 9/5072* (2013.01); *G06F 2209/502* (2013.01)

(58) Field of Classification Search
  CPC ..... H04L 47/78; G06F 9/5088; G06F 9/5072; G06F 2209/502

USPC .......................... 709/201, 217, 221, 226, 224
See application file for complete search history.

(56) References Cited

U.S. PATENT DOCUMENTS

| 2006/0271700 | A1 | 11/2006 | Kawai et al. |  |
| 2009/0106409 | A1 | 4/2009 | Murata |  |
| 2009/0144393 | A1 | 6/2009 | Kudo |  |
| 2011/0055390 | A1* | 3/2011 | Malloy et al. | 709/224 |
| 2014/0006480 | A1* | 1/2014 | Dobrev et al. | 709/203 |
| 2014/0143426 | A1* | 5/2014 | Yamashita | 709/226 |

FOREIGN PATENT DOCUMENTS

| JP | 2006-332825 | 12/2006 |
| JP | 2009-116852 | 5/2009 |
| JP | 2009-134687 | 6/2009 |

* cited by examiner

*Primary Examiner* — Michael Y Won
(74) *Attorney, Agent, or Firm* — Staas & Halsey LLP

(57) ABSTRACT

An information processing method includes dispersively assigning a virtual machine and a storage device that stores data to be processed by the virtual machine, to a combination of data centers coupled to each other through a relay device, reducing a response time from a time when a request for a process is transmitted to the virtual machine to a time when a result of the process is returned from the virtual machine after accessing to the storage device through the relay device by the virtual machine.

11 Claims, 20 Drawing Sheets

FIG. 6

|         | VM101 | VM102 | VM103 |
|---------|-------|-------|-------|
| DISK111 | 0.5   | 1     | 0.1   |
| DISK112 | 0.3   | 0.2   | 0.1   |

FIG. 7

|          | VM101 | VM102 | VM103 |
|----------|-------|-------|-------|
| DISK111  | 10    | 9     | 1     |
| DISK112  | 3     | 1     | 1     |

FIG. 11

|  | DC100 | DC200 | DC300 | DC400 |
|---|---|---|---|---|
| VM | 3/3 | 2/3 | 2/3 | 1/3 |
| DISK | 2/3 | 1/3 | 1/3 | 2/3 |

FIG. 12

|  | L710 | L720 | L730 | L740 | L750 | L760 | L770 | L780 |
|---|---|---|---|---|---|---|---|---|
| LINK USAGE RATE | 20 | 20 | 50 | 40 | 20 | 20 | 90 | 60 |

FIG. 13

|  | DC100 | DC200 | DC300 | DC400 |
|---|---|---|---|---|
| DISTANCE FROM CLIENT 800 | 500km | 350km | 400km | 200km |

FIG. 14

|         | VM101 | VM102 | VM103 |
|---------|-------|-------|-------|
| DISK111 | 5ms   | 5ms   | 5ms   |
| DISK112 | 5ms   | 5ms   | 5ms   |

FIG. 15A

|  | VM | DISK |
|---|---|---|
| DC200 | VM103 | DISK112 |
| DC400 | VM101,VM102 | DISK111 |

FIG. 15B

|  | VM | DISK |
|---|---|---|
| DC300 | VM103 | DISK112 |
| DC400 | VM101,VM102 | DISK111 |

FIG. 16A

|  | DC100 | DC200 | DC300 | DC400 |
|---|---|---|---|---|
| CLIENT 800 | 5.0ms | 3.5ms | 4.0ms | 2.0ms |

FIG. 16B

|  | DC100 | DC200 | DC300 | DC400 |
|---|---|---|---|---|
| DC100 | – | 1.5ms | 1.0ms | 3.0ms |
| DC200 | 1.5ms | – | 3.5ms | 1.5ms |
| DC300 | 1.0ms | 3.5ms | – | 2.0ms |
| DC400 | 3.0ms | 1.5ms | 2.0ms | – |

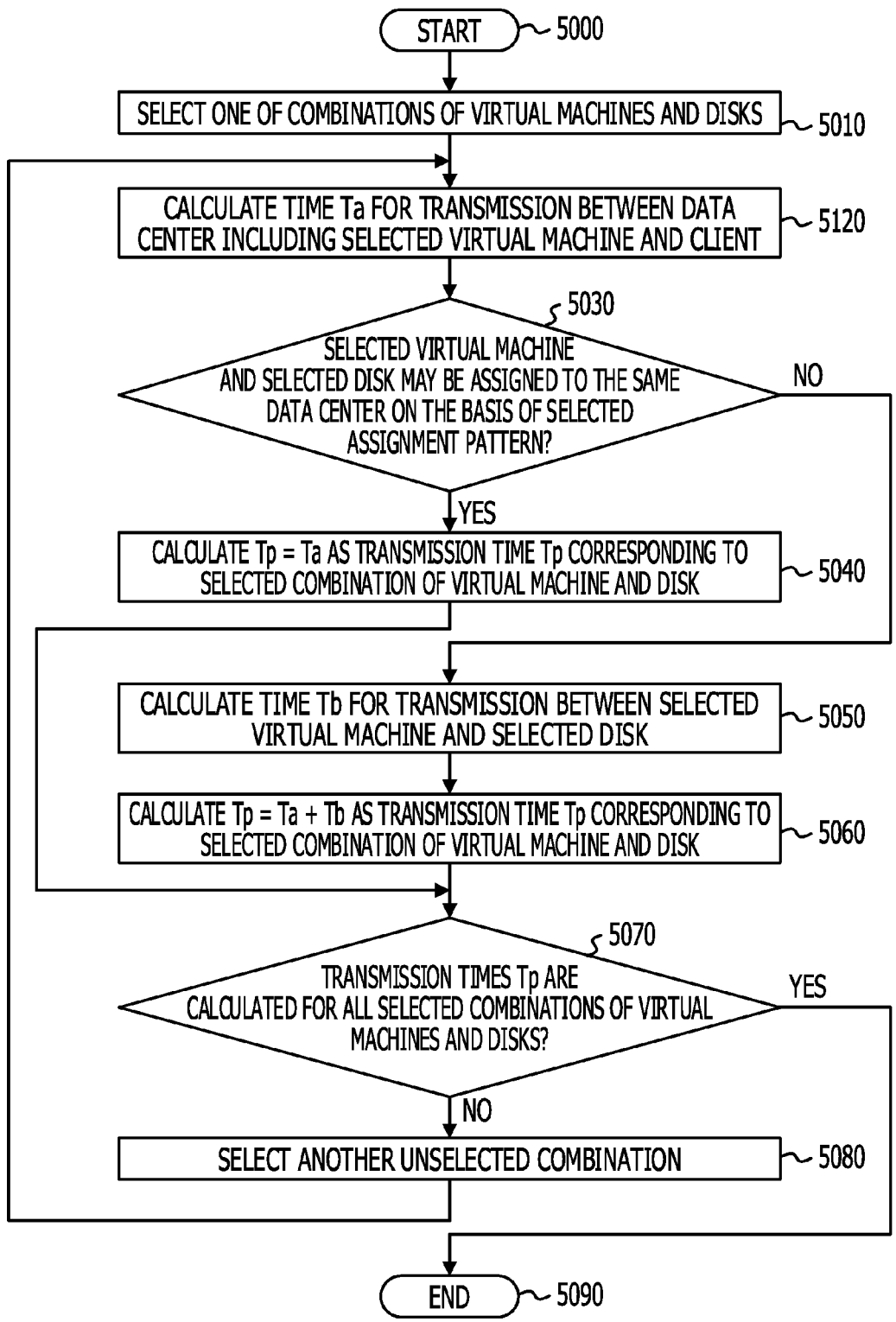

FIG. 19A

|  | VM101 | VM102 | VM103 |
|---|---|---|---|
| DISK111 | 2.0ms | 2.0ms | 11.3ms |
| DISK112 | 11.3ms | 11.3ms | 3.5ms |

FIG. 19B

|  | VM101 | VM102 | VM103 |
|---|---|---|---|
| DISK111 | 2.0ms | 2.0ms | 9.2ms |
| DISK112 | 9.2ms | 9.2ms | 4.0ms |

INFORMATION PROCESSING METHOD, RECORDING MEDIUM, AND INFORMATION PROCESSING DEVICE

CROSS-REFERENCE TO RELATED APPLICATION

This application is based upon and claims the benefit of priority of the prior Japanese Patent Application No. 2012-255286, filed on Nov. 21, 2012, the entire contents of which are incorporated herein by reference.

FIELD

The embodiment discussed herein is related to an information processing method, a recording medium, and an information processing device.

BACKGROUND

A services is provided by cloud computing using a plurality of data centers that include servers and disks and are coupled to each other through a network. A process that is requested by a client is executed by assigning any of physical resources included in a system using a plurality of data centers to a virtual machine and a disk.

A technique is known, which is to make an inquiry to a data center about whether or not a requirement for a network for an application executed in another data center, a requirement for a server for the application, and a requirement for storage for the application are satisfied, and to migrate the application to the other data center if the requirements are satisfied.

In addition, a technique is known, which is to identify the position of a client on a network by analyzing a request transmitted by the client, determine, for each of data centers, a processing delay time to the time when the client receives a response from the data center based on a communication path between the client and the data center, select, as a recommended center based on the determined processing delay times on a priority basis, a data center that provides a service with a short delay time, and execute, in a server included in the recommended center, the service to be provided to the client that has output the request.

Japanese Laid-open Patent Publications Nos. 2009-134687 and 2006-332825 are examples of related art.

SUMMARY

According to an aspect of the invention, an information processing method includes dispersively assigning a virtual machine and a storage device that stores data to be processed by the virtual machine, to a combination of data centers coupled to each other through a relay device, reducing a response time from a time when a request for a process is transmitted to the virtual machine to a time when a result of the process is returned from the virtual machine after accessing to the storage device through the relay device by the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of information on the frequencies of requests transmitted by the client to virtual machines;

FIG. 7 illustrates an example of information on the frequencies of access to disks by the virtual machines;

FIG. 11 illustrates an example of information of use of resources of the data centers;

FIG. 12 illustrates an example of link usage rates of communication paths included in a network;

FIG. 13 illustrates an example of information on distances to the data centers;

FIG. 14 illustrates an example of a response time before migration;

FIGS. 15A and 15B illustrate examples of candidates for an assignment pattern after the migration;

FIGS. 16A and 16B illustrate examples of transmission times between sites included in the network;

FIG. 17 illustrates another example of the process that is executed by the control computer according to the embodiment;

FIGS. 19A and 19B illustrate examples of response times for each of candidates for an assignment pattern after the migration.

DESCRIPTION OF EMBODIMENT

According to consideration of the inventors, when an assignee of a virtual machine and a storage device accessed by the virtual machine is changed, a response time to the time when a process result is returned to a client may increase. For example, when a virtual machine executed by a certain data center or server and a storage device accessed by the virtual machine are distributed and migrated to a plurality of data centers coupled through a network or servers coupled through the network in order to effectively use resources of a plurality of data centers, a response time to the time when a process result is returned to the client may become longer than a response time before the migration by causing the virtual machine to access the storage device through the network.

According to the embodiment described below, the response time may be reduced by changing the assignee of the virtual machine and storage device.

Figure 1:
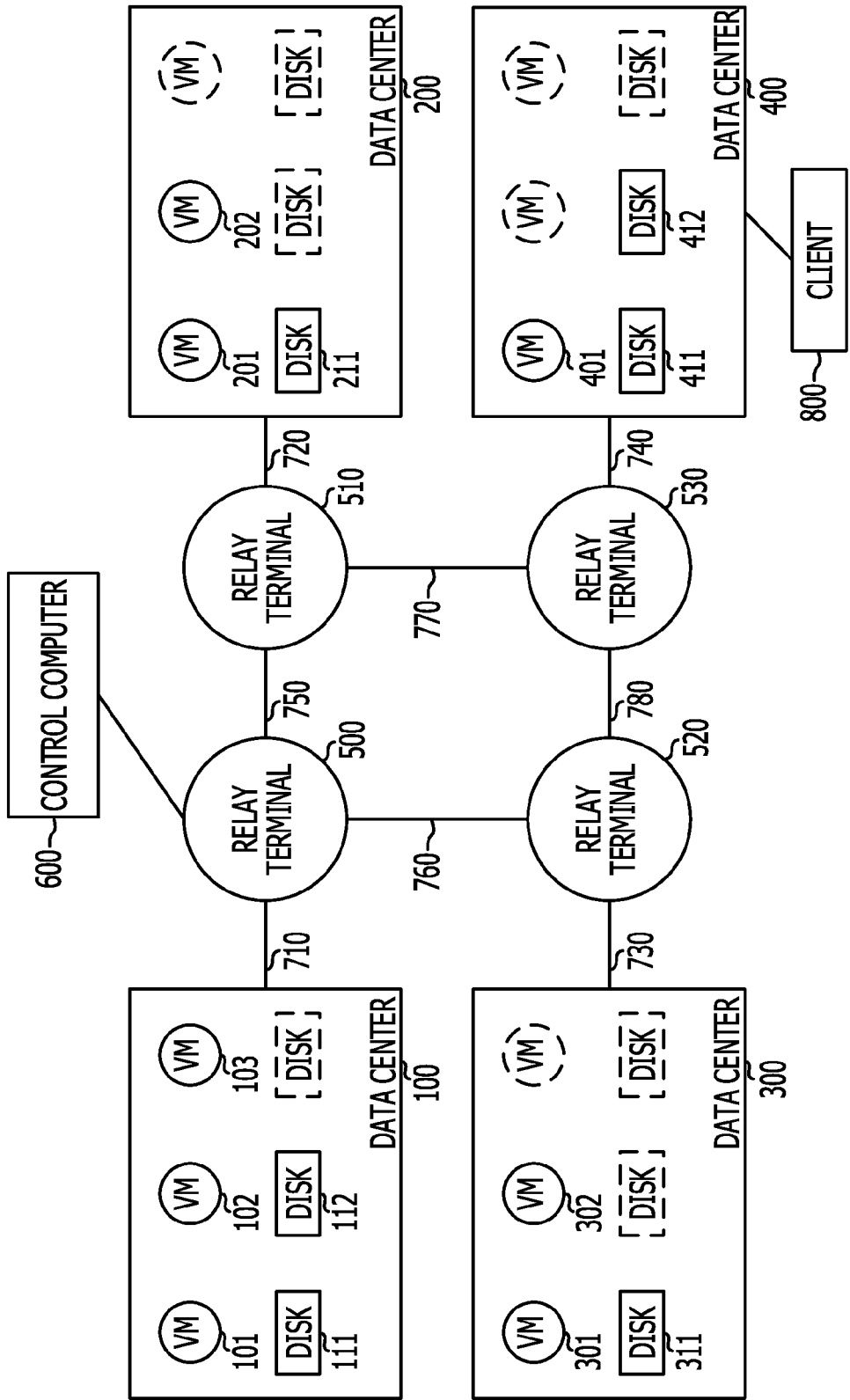
FIG. 1 illustrates an example of an information processing system according to the embodiment.

FIG. 1 illustrates an example of an information processing system according to the embodiment. The information processing system includes data centers (DCs) 100, 200, 300, and 400, relay devices 500, 510, 520, and 530, a control computer 600, and communication paths 710, 720, 730, 740, 750, 760, 770, and 780. A client 800 is coupled to the data center 400.

The data centers 100 to 400 each include at least one server and at least one storage device coupled to the server. A virtual machine (VM) is executed by assigning resources such as a CPU and a memory that are included in the server. A disk such as a hard disk drive (HDD) is assigned as a storage region from the storage device to the virtual machine, and data that is used for a process to be executed by the virtual machine is stored in the disk. The storage device according to the embodiment is not limited to the disk. A memory or storage such as a solid state drive (SSD) may be used as the storage device.

For example, virtual machines 101 and 102 are executed in the data center 100 by assigning a resource of the server included in the data center 100. In addition, storage region of the storage device included in the data center 100 are assigned as disks 111 and 112. It is assumed that a resource that is used to execute a single virtual machine as well as the virtual machines 101 and 102 is available in the data center 100. In FIG. 1, virtual machines that may be executed by the available resource are each indicated by "VM" surrounded by a dotted line (without a reference numeral). It is assumed that a resource that is used to assign a single disk as well as the disks 111 and 112 is available in the data center 100. In FIG. 1, disks that may be assigned by the available resource are each indicated by "DISK" surrounded by a dotted line (without a reference numeral). The constituent parts indicated by the dotted lines are the available virtual machines and the available disks.

The configurations of the data centers 200, 300, and 400 are substantially the same as the configuration of the data center 100, and a description thereof is omitted. The following describes the embodiment in which the number of virtual machines that may be executed in each of the data centers 100 to 400 is 3 and the number of disks that may be assigned in each of the data centers 100 to 400 is 3. The embodiment is not limited to this. The number of virtual machines and the number of disks may be determined based on the performance and number of servers included in each of the data centers 100 to 400 and the capacities of the storage devices.

The data centers 100 to 400 are coupled to each other by the relay devices 500 to 530 and the communication paths 710 to 780 that connect the relay devices 500 to 530. The relay devices 500 to 530 are devices that are routers (RTs) or the like and control communication paths. The communication paths 710 to 780 are optical fibers, phone lines, or the like. The virtual machines that are executed in the data centers 100 to 400 communicate with each other through the relay devices 500 to 530 and the communication paths 710 to 780.

The control computer 600 controls migration of a virtual machine and a disk through the relay devices 500 to 530 and the communication paths 710 to 780 as described later and collects information on the state of communication from relay devices through the relay devices 500 to 530 and the communication paths 710 to 780.

The client 800 is coupled to the data center 400. It is assumed that an application is executed by the client 800 using the disks 111 and 112 and the virtual machines 101 and 102 executed in the data center 100. The client 800 communicates with the data center 100 through the relay devices 500 to 530 and the communication paths 710 to 780 in order to execute the application.

FIGS. 2A, 2B, 2C and 2D illustrate examples of a response time from the time when a client requests a virtual machine to execute a process to the time when a result of the process is returned to the client. FIGS. 2A to 2D illustrate, as the examples, time charts in which the client 800 illustrated in FIG. 1 transmits a request to execute the process to the virtual machine 101, and the virtual machine 101 accesses the disk 111 three times in order to execute the requested process and returns the result of the process to the client 800.

Figure 2A:
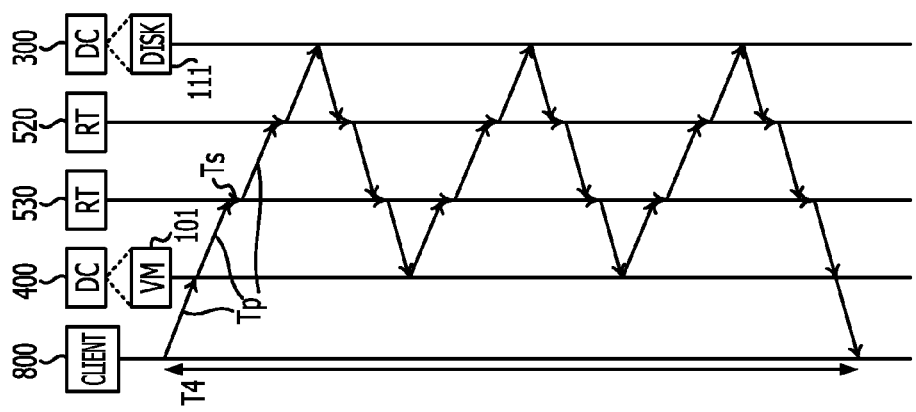
FIGS. 2A, 2B, 2C and 2D illustrate examples of a response time from the time when a client requests a virtual machine to execute a process to the time when a result of the process is returned to the client.

In the example of FIG. 2A, the client 800 illustrated in FIG. 1 transmits the request to execute the process through the data center 400, the relay device 530, the relay device 520, and the relay device 500 to the virtual machine 101 executed in the data center 100, and the virtual machine 101 accesses the disk 111 three times in order to execute the requested process and returns a result of the process to the client 800 through the relay device 500, the relay device 520, the relay device 530, and the data center 400. The relay devices 500, 520, and 530 are each indicated by "RT".

A symbol "T1" illustrated in FIG. 2A indicates a response time from the time when the client 800 transmits the request to execute the process to the time when the client 800 receives the result of the process. The response time "T1" described later in detail is the sum of a transmission time "Tp", a transfer processing time "Ts", and an access time "Ta". The transmission time "Tp" is the sum of transmission times between a client and a data center, transmission times between relay devices and data centers, and transmission times between the relay devices. The transfer processing time "Ts" is the sum of times for data transfer processing executed by the relay devices. The access time "Ta" is the sum of times for access between a virtual machine and a disk.

The transmission time "Tp" illustrated in FIG. 2A is the sum of the transmission times between the sites or the sum of the transmission times between the client and the data center, the transmission times between the relay devices and the data centers, and the transmission times between the relay devices from the time when the client 800 transmits the request to execute the process to the time when the client 800 receives the result of the process. The transmission time "Tp" is also referred to as a transmission delay and may be calculated as a time that depends on a distance. Typically, the transmission time "Tp" is calculated as a time of approximately 0.5 ms per 100 km for optical communication that is executed using optical fibers. In the example illustrated in FIG. 2A, distances between the sites are equal to each other, or a distance between the client and the data center, distances between the data centers and the relay devices, and distances between the relay devices, are equal to each other. The distances between the sites may be different, and it is sufficient if the transmission times between the sites are calculated depending on the distances.

In FIG. 2A, a part is omitted in order to avoid complicated illustration, and parts of spaces between the sites considered for the calculation of the transmission time "Tp" are indicated by reference lines. For example, the time for transfer of data from the client 800 to the data center 400, the time for transfer of the data from the data center 400 to the relay device 530, the time for transfer of the data from the relay device 530 to the relay device 520, and the like are considered for the calculation of the transmission time "Tp".

The transfer processing time "Ts" illustrated in FIG. 2A is the sum of times for data transfer processing executed by the relay devices from the time when the client 800 transmits the request to execute the process to the time when the client 800 receives the result of the process and is also referred to as a processing delay. In FIG. 2A, a part is omitted in order to avoid complicated illustration, and parts of the processing considered for the calculation of the transfer processing time "Ts" are indicated by reference lines. For example, the time for the data transfer processing executed by the relay device 530 is considered for the calculation of the transfer processing time "Ts".

The transfer processing time "Ts" depends on link usage rates of the communication paths between the sites. The link usage rates are the ratios of bands used for the communication paths to the maximum bands of the communication paths. For example, when a band of 2 Gbps is already used for a communication path of which a band is 10 Gbps, the link usage rate of the communication path is 20%. For example, when communication is executed through a plurality of communication paths, the transfer processing time "Ts" is determined based on the link usage rate of a communication path in which the amount of traffic is largest. This is due to the fact that even if a band of another communication path among the plurality of communication paths is available, the amount of traffic is large in the communication path of which the link usage rate is relatively high, and data is not transmitted through the communication paths. In this case, the data is buffered in at least one of the relay devices. If the amount of the data exceeds the capacity of the buffering, feedback is executed so as not to transfer the data and communication is executed based on the band of the communication path in which the amount of traffic is largest and of which the link usage rate is relatively high. For example, the case where data is transferred from the relay device 530 to the relay device 500 is considered. In this case, it is assumed that the maximum band of the communication path 780 between the relay device 530 and the relay device 520 is 10 Gbps, the link usage rate of the communication path is 40%, the maximum band of the communication path between the relay device 520 and the relay device 500 is 10 Gbps, and the link usage rate of the communication path is 20%. Based on this assumption, even if the band of the communication path through which the data is transferred from the relay device 520 to the relay device 500 is relatively available, the rate of transfer of the data to the relay device 520 depends on the link usage rate of 40%, and whereby the transfer of the data from the relay device 520 to the relay device 500 depends on the data transfer rate.

The access time "Ta" illustrated in FIG. 2A is the sum of the time periods in which the virtual machine 101 accesses the disk 111 in order to execute the process requested by the client 800. The example in which the virtual machine 101 accesses the disk 111 three times in order to execute the requested process is illustrated. The time period in which the virtual machine 101 accesses the disk 111 three times is the access time "Ta". In FIG. 2A, the access time "Ta" is relatively shorter than the transmission time "Tp" and the transfer processing time "Ts" that are determined based on communication executed through the network. This is due to the fact that the virtual machine 101 accesses the disk 111 within the same data center 100.

Figures 2B, 2C, 2D:
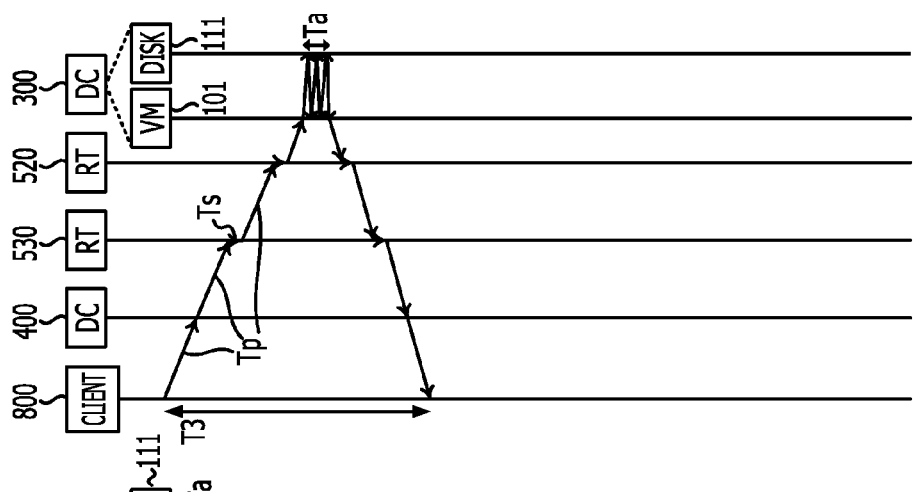

Transmission times "Tp", transfer processing times "Ts", and "access times "Ta" are also illustrated in FIGS. 2B, 2C, and 2D and have the same meaning as the times "Tp", "Ts", and "Ta" described with reference to FIG. 2A.

FIG. 2B exemplifies the time chart in which when the virtual machine 101 and the disk 111 are migrated from the data center 100 to the data center 400 that is closest to the client 800 illustrated in FIG. 1, the client 800 transmits the request to execute the process to the virtual machine 101, and the virtual machine 101 accesses the disk 111 three times in order to execute the requested process and returns a result of the process to the client 800. A response time "T2" is a time period from the time when the client 800 transmits the request to the time when the result of the process is returned to the client 800. The data transfer is executed without another data center and the relay devices in the example illustrated in FIG. 2B, compared with the example illustrated in FIG. 2A. Thus, the response time "T2" is the sum of the transmission time "Tp" and the access time "Ta".

FIG. 2C illustrates the example in which when the virtual machine 101 and the disk 111 are migrated from the data center 100 to the data center 300 illustrated in FIG. 1, the client 800 transmits the request to execute the process through the data center 400, the relay device 530, and the relay device 520 to the virtual machine 101 executed in the data center 300, and the virtual machine 101 accesses the disk 111 three times in order to execute the requested process and returns a result of the process to the client 800 through the relay device 520, the relay device 530, and the data center 400. A response time "T3" is a time period from the time when the client 800 transmits the request to the time when the result of the process is returned to the client 800. The response time "T3" is shorter than the response time "T1" since an overall communication path in the example illustrated in FIG. 2C is shorter than an overall communication path in the example illustrated in FIG. 2A and the communication is executed without the relay device 500.

FIG. 2D illustrates the example in which the virtual machine 101 is migrated from the data center 100 to the data center 400 illustrated in FIG. 1 and the disk 111 is migrated to the data center 300. The client 800 transmits the request to execute the process to the virtual machine 101, and the virtual machine 101 accesses the disk 111 within the data center 300 through the relay device 530 and the relay device 520 three times in order to execute the requested process and returns a result of the process to the client 800. A response time "T4" is a time period from the time when the client 800 transmits the request to the time when the result of the process is returned to the client 800. Since the virtual machine 101 and the disk 111 are migrated to the different data centers 400 and 300, respectively, communication is executed through a network between the data centers 300 and 400 every time the virtual machine 101 accesses the disk 111. In this case, a transmission delay and a processing delay occur in the communication executed through the network, the response time "T4" is longer than the response times "T1", "T2", and "T3" in the examples illustrated in FIGS. 2A, 2B, and 2C.

If the amount of data that is communicated between the virtual machine 101 and the disk 111 is smaller than the amount of data of the request transmitted by the client 800 and the amount of data of the process result transmitted by the virtual machine 101, the transmission time Tp and the transfer processing time Ts are longer than the access time Ta. For example, log data which is related to the intensity of a bridge and collected from a center having the bridge is accumulated in a certain data center for a long time of, for example, one year. In order to acquire chronological data on the intensity based on analysis of the accumulated log data, a trigger signal is transmitted at a rate in kbps from the client 800 to the data center 100 in order to start the analysis, and data with a large amount is communicated between the virtual machine 101 and the disk 111 during the analysis.

As illustrated in FIGS. 2A, 2B, and 2C, when the communication is executed between the virtual machine 101 and the disk 111 in a data center, a delay that is caused by the access to the disk 111 is smaller than a transmission delay in communication that is executed at a distance of several hundreds of kilometers between data centers, and a delay of processing by a relay device located on a network between the data centers. Thus, even when data with a large amount is communicated between the virtual machine and the disk in the same data center during analysis, the access time may be ignored with respect to the response time to the time when the result of the process is returned to the client.

As illustrated in FIG. 2D, however, when a virtual machine and a disk are migrated to different data centers, and the virtual machine accesses the disk through the network between the data centers, data with a large amount is communicated through the network a plurality of times, and the transmission time "Tp" and the processing delay by the relay devices are longer than those in the examples illustrated in FIGS. 2A, 2B, and 2C, and the impact of the access time "Ta" on the response time "T4" may not be ignored.

For example, the client 800 that receives a service from the disks 111 and 112 and the virtual machines 101 to 103 executed in the data center 100 may change the contents of a contract to contents guaranteeing a low delay in order to receive the service with a lower delay. In this case, it is considered that the transmission time and the transfer processing time in the network are reduced by migrating the virtual machines 101 to 103 and the disks 111 and 112 to the data center 400 located closer to the client 800. When resources that are used to migrate all the virtual machines 101 to 103 and the disks 111 and 112 to the data center 400 located closest to the client 800 are available in the data center 400, the migration is executed using the resources.

As illustrated in FIG. 1, however, if available resources within the data center 400 are two virtual machines and a single disk, the available resources are not sufficient to migrate all the virtual machine 101 to 103 and the disks 111 and 112. In this case, when the virtual machines 101 to 103 and the disks 111 and 112 are distributed and migrated to the data centers 200 to 400, the communication described in the examples of FIGS. 2B, 2C, and 2D may be executed between the virtual machines 101 to 103 and the disks 111 and 112 after the migration. If the communication illustrated in FIG. 2D is executed, a delay in the transmission to the client 800 may increase.

As described above, if virtual machines and disks are distributed to a plurality of data centers in order to effectively use resources of the a plurality of data centers and a service is provided, access that is expected to be executed between the virtual machines and the disks in a single data center for a relatively short time is executed between the data centers. Thus, in order to improve the service experience of the client, it is not sufficient to consider only the amount of resources to be assigned for the request provided by the client. As illustrated in FIG. 2D, the larger the number of times of the access by the virtual machine to the disk, the longer the response time from the time when the client transmits the request to execute the process to the time when the client receives the result of the process. Thus, the number of times of the access, the delay, caused by the access, in the transmission in the network, and the processing delay caused by the relay devices are considered. As described above, there is a conflict in effectively using resources of a plurality of data centers and reducing the time for the response to the client.

According to the embodiment described later, when a virtual machine and a storage device are to be assigned to a plurality of assignees, a response delay to the time when a result of the process is returned to a user may be reduced by selecting a combination of assignees that cause a reduction in the response time based on the frequency of the access to the storage device.

Figure 3:
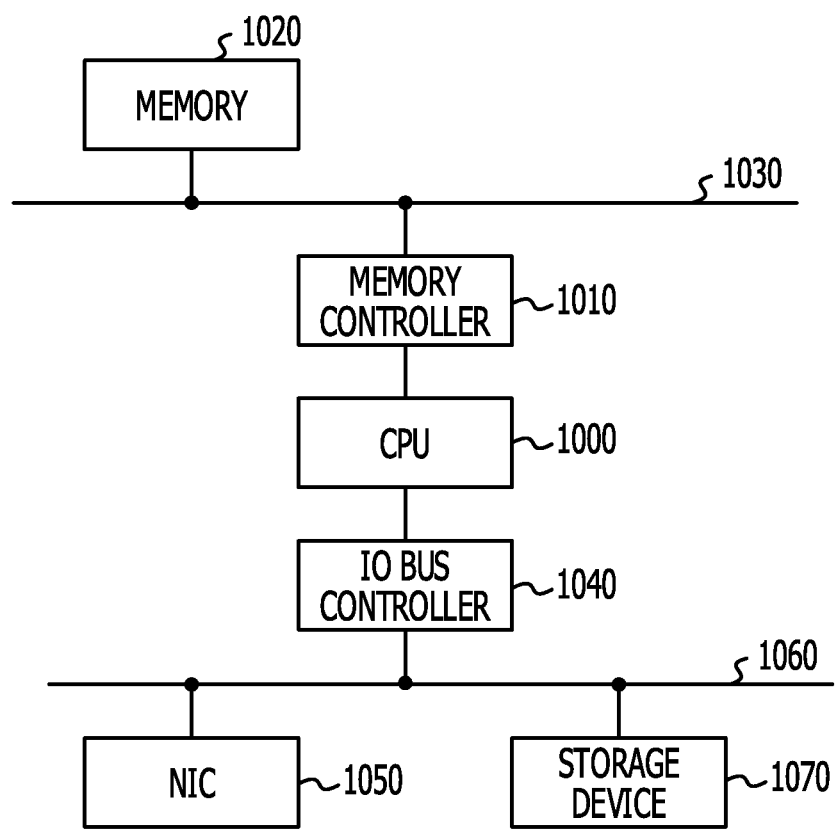
FIG. 3 illustrates an example of a hardware configuration of a server according to the embodiment.

FIG. 3 illustrates an example of a hardware configuration of the server according to the embodiment. The data centers 100 to 400 according to the embodiment each include at least one server and at least one disk coupled to the server. The server includes a CPU 1000, a memory controller 1010, a memory 1020, a memory bus 1030, an IO bus controller 1040, an NIC 1050, and an IO bus 1060. A storage device 1070 that corresponds to the aforementioned disk is coupled to the IO bus 1060.

A program that causes the server to execute various processes is stored in the memory 1020 coupled to the memory bus 1030. The CPU 1000 reads the program from the memory 1020 through the memory controller 1010 and executes the various processes. For the various processes executed by the CPU 1010, data is written and read in and from the memory 1020 through the memory controller 1010.

The CPU 1000 transfers, through the IO bus controller 1040 to the NIC 1050 coupled to the IO bus 1060, data and a packet that are transmitted by the server. The CPU 1000 receives data and a packet that have been transmitted to the server. The CPU 1000 reads data through the IO bus controller 1040 from the storage device 1070 coupled to the IO bus 1060 and writes data in the storage device 1070.

The CPU 1000 may include at least one CPU core for executing the various processes. The CPU core may include at least one processor. The memory 1020 is, for example, a random access memory (RAM) such as a dynamic RAM (DRAM). The storage device 1070 is, for example, a non-volatile memory such as a read only memory (ROM) or a flash memory or a magnetic disk device such as a hard disk drive (HDD).

A configuration in which the CPU 1000, the memory controller 1010, the memory 1020, the NIC 1050, and the storage device 1070 are coupled through the same bus may be applied to the servers included in the data centers 100 to 400 according to the embodiment. Functional blocks described later of the server are achieved by the hardware configuration illustrated in FIG. 3, and the processes are executed by the configuration illustrated in FIG. 3.

Figure 4:
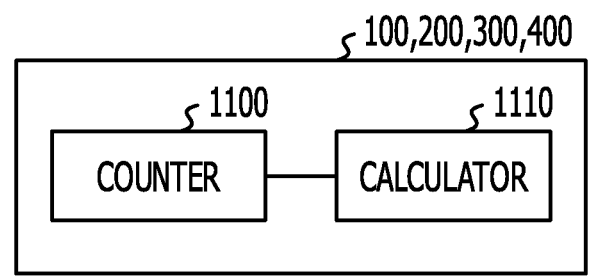
FIG. 4 illustrates an example of functional blocks of the server included in each of data centers according to the embodiment.

FIG. 4 illustrates an example of the functional blocks of the server included in each of data centers according to the embodiment. In the server included in each of the data centers 100 to 400 according to the embodiment, the program that is stored in the storage device 1070 is loaded onto the memory 1020 that is used as a working memory. The server functions as a counter 1100 and a calculator 1110 by causing the CPU 1000 to execute the program loaded on the memory 1020. The processes that are executed by the functional blocks correspond to a process illustrated in FIG. 5 and are described below.

Figure 5:
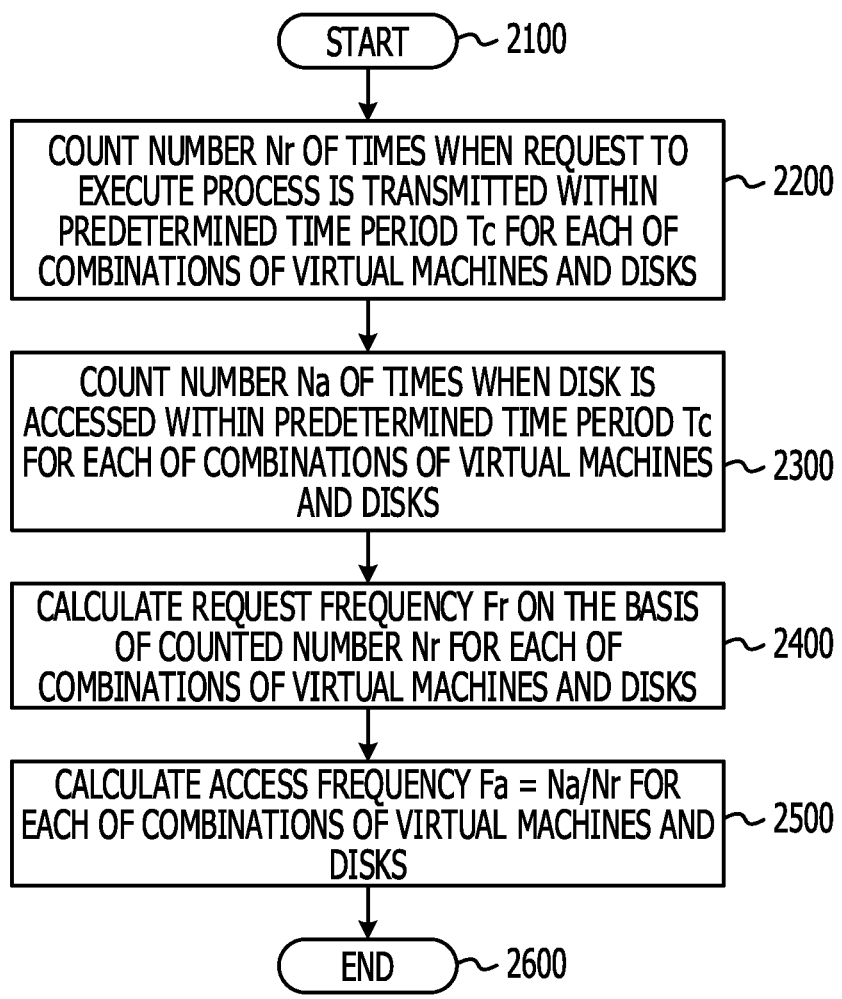
FIG. 5 illustrates an example of a process that is executed by the server included in each of the data centers according to the embodiment.

FIG. 5 illustrates an example of the process that is executed by the server included in each of the data centers according to the embodiment.

When receiving the request to execute the process from the client, the server that is included in each of the data centers 100 to 400 executes a process 2100 of starting the process illustrated in FIG. 5 in order to calculate request frequencies and access frequencies.

The counter 1100 executes a process 2200 of counting the number Nr of times when the execution of the process is requested within a certain time period Tc for each of combinations of virtual machines and disks. In the process 2200, the counter 1100 counts the number Nr of times within the certain time period Tc for each of the combinations by specifying a virtual machine based on a destination address included in the header of a packet transmitted by the client for the request to execute the process and by monitoring a disk accessed for the requested process. The destination address is a media access control (MAC) address assigned to the virtual machine, an Internet Protocol (IP) address assigned to the virtual machine, or the like.

The counter 1100 executes, for each of the combinations of the virtual machines and the disks, a process 2300 of counting the number Na of times when a disk is accessed within the certain time period Tc. In the process 2300, the counter 1100 counts the number Na of times of the access executed within the certain time period Tc for each of the combinations by specifying a virtual machine based on a destination address included in a header of a packet transmitted by the client for the request to execute the process, monitoring a disk accessed for the requested process, and counting the number of times when the disk is accessed until a result of the process is returned to the client.

The calculator 1110 executes a process 2400 of calculating a request frequency Fr for each of the combinations of the virtual machines and the disks based on the number Nr counted in the process 2200 for each of the combinations. In the process 2200, the numbers Nr are normalized based on any (for example, the maximum number Nr) of the numbers Nr. In the process 2400, the calculator 1110 calculates the frequency Fr of the request to execute the process transmitted by the client for each of the combinations of the virtual machines and the disks and calculates relative relationships among the request frequencies Fr calculated for the combinations. The request frequencies Fr calculated in the process 2400 are information later described in FIG. 6 and are stored in the memory 1020.

The calculator 1110 executes a process 2500 of calculating an access frequency Fa=Na/Nr for each of the combinations of the virtual machines and the disks. The process 2500 is to calculate, as an access frequency Fa, the average of the numbers of times when a disk is accessed per time of transmission of the request by the client. The access frequencies Fa calculated in the process 2500 are information described later in FIG. 6 and are stored in the memory 1020.

FIG. 6 illustrates an example of information on frequencies of requests transmitted by the client to the virtual machines. The request frequencies Fr are information calculated in the process 2400 illustrated in FIG. 5 and stored in the memory 1020. In the example illustrated in FIG. 6, a number Nr that corresponds to a combination of the virtual machine 102 illustrated in FIG. 1 and the disk 111 is largest among the numbers Nr counted in the process 2200, and the numbers Nr are normalized based on the number Nr corresponding to the combination of the virtual machine 102 and the disk 111.

For example, a request frequency Fr that corresponds to a combination of the virtual machine 102 and the disk 111 is "1", and a request frequency Fr that corresponds to a combination of the virtual machine 101 and the disk 111 is normalized and "0.5".

In order to identify that the virtual machines 101 to 103 and the disks 111 and 112 are resources assigned to a specific client and are used to execute a process requested by the specific client, common identification information that identifies the specific client is associated with the virtual machines 101 to 103 and the disks 111 and 112 and managed. For example, a MAC address or IP address that is assigned to the specific client may be used as the common identification information.

FIG. 7 illustrates an example of information on frequencies of access by the virtual machines to the disks. The access frequencies Fa are the information calculated in the process 2500 illustrated in FIG. 5 and stored in the memory 1020. An access frequency Fa calculated for each of the combinations illustrated in FIG. 7 is the average of the numbers of times when a virtual machine accesses a disk per time of transmission of a request transmitted by the client. FIG. 7 illustrates the example in which when the client transmits the request to execute the process to the virtual machine 101 one time, the virtual machine 101 accesses the disk 111 ten times on average and returns a result of the process to the client.

Figure 8:
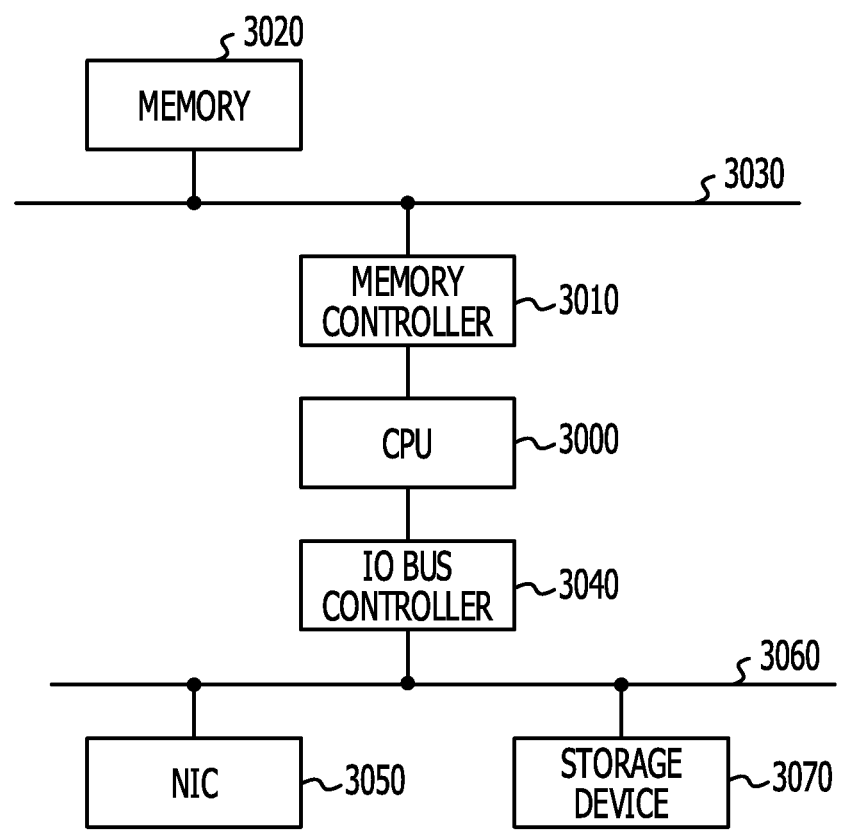
FIG. 8 illustrates an example of a hardware configuration of a control computer according to the embodiment.

FIG. 8 illustrates an example of a hardware configuration of the control computer according to the embodiment. The control computer 600 according to the embodiment includes a CPU 3000, a memory controller 3010, a memory 3020, a memory bus 3030, an IO bus controller 3040, an NIC 3050, an IO bus 3060, and a storage device 3070.

A program that causes the control computer 600 to execute various processes is stored in the memory 3020 coupled to the memory bus 3030. The CPU 3000 reads the program from the memory 3020 through the memory controller 3010 and executes the various processes. For the various processes executed by the CPU 3000, data is written and read in and from the memory 3020 through the memory controller 3010.

The CPU 3000 transfers, through the IO bus controller 3040 to the NIC 3050 coupled to the IO bus 3060, data and a packet that are transmitted by the control computer 600. The CPU 3000 receives data and a packet that have been transmitted to the control computer 600. The CPU 3000 reads data through the IO bus controller 3040 from the storage device 3070 coupled to the IO bus 3060 and writes data in the storage device 3070.

The CPU 3000 may include at least one CPU core for executing the various processes. The CPU core may include at least one processor. The memory 3020 is, for example, a random access memory (RAM) such as a dynamic RAM (DRAM). The storage device 3070 is, for example, a non-volatile memory such as a read only memory (ROM) or a flash memory or a magnetic disk device such as a hard disk drive (HDD).

A configuration in which the CPU 3000, the memory controller 3010, the memory 3020, the NIC 3050, and the storage device 3070 are coupled through the same bus may be applied to the control computer 600 according to the embodiment. Functional blocks described later of the control computer 600 are achieved by the hardware configuration illustrated in FIG. 8, and the processes are executed by the configuration illustrated in FIG. 8.

Figure 9:
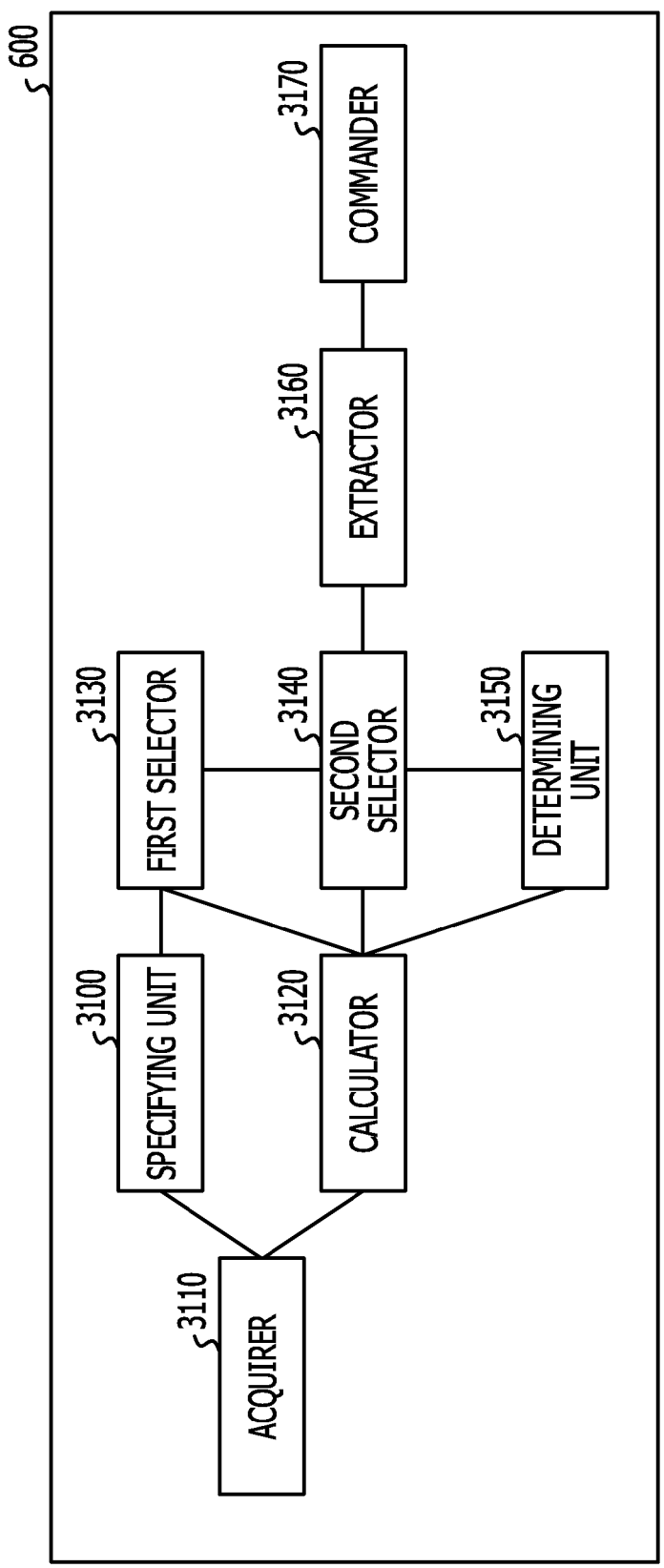
FIG. 9 illustrates an example of functional blocks of the control computer according to the embodiment.

FIG. 9 illustrates an example of the functional blocks of the control computer according to the embodiment. In the control computer 600 according to the embodiment, the program that is stored in the storage device 3070 is loaded onto the memory 3020 that is used as a working memory. The control computer 600 functions as a specifying unit 3100, an acquirer 3110, a calculator 3120, a first selector 3130, a second selector 3140, a determining unit 3150, an extractor 3160, and a commander 3170 by causing the CPU 3000 to execute the program loaded on the memory 3020. The processes that are executed by the functional blocks correspond to a process illustrated in FIG. 10 and are described below.

Figure 10A:
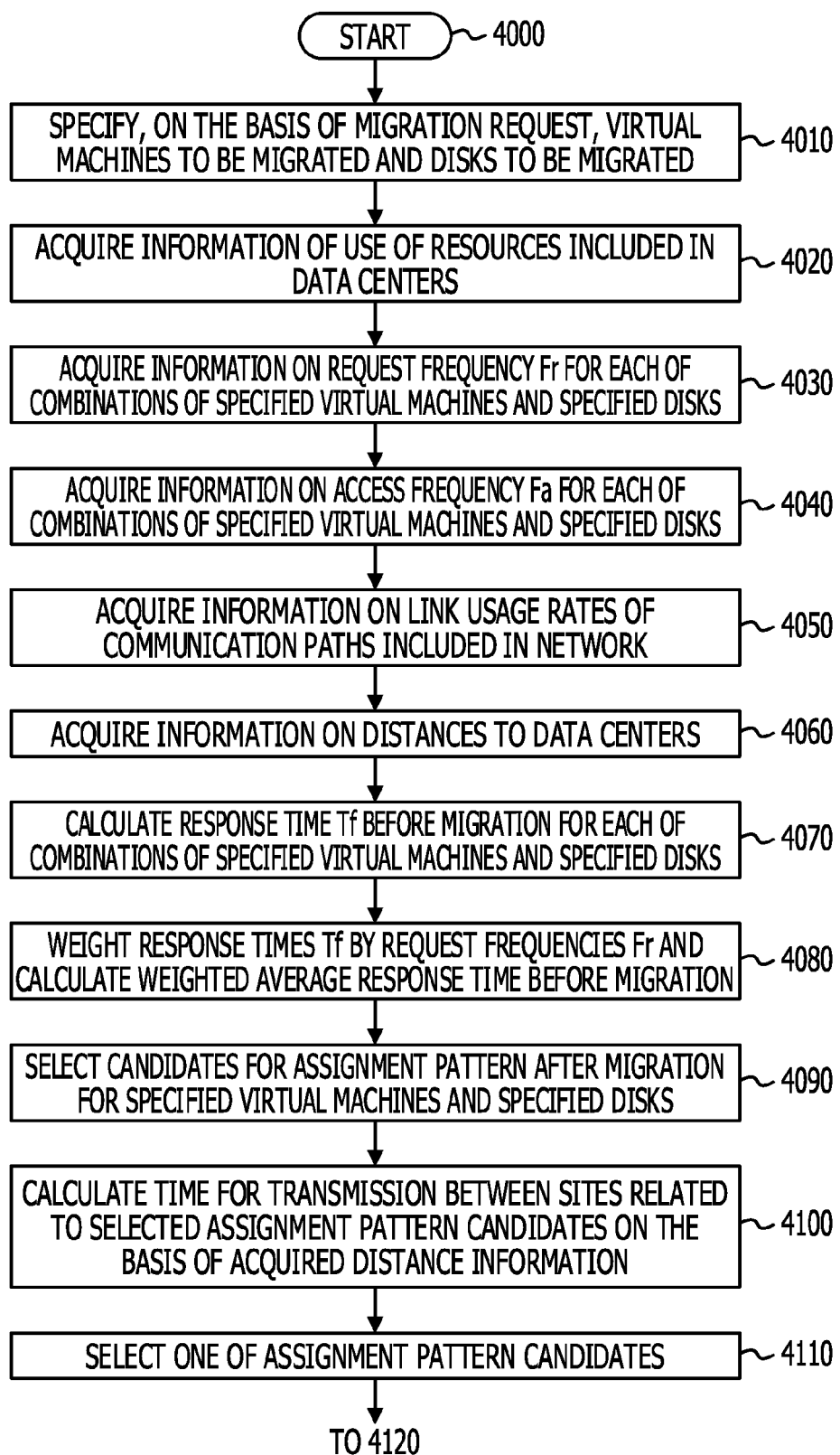
FIGS. 10A and 10B illustrate an example of a process that is executed by the control computer according to the embodiment.
Figure 10B:
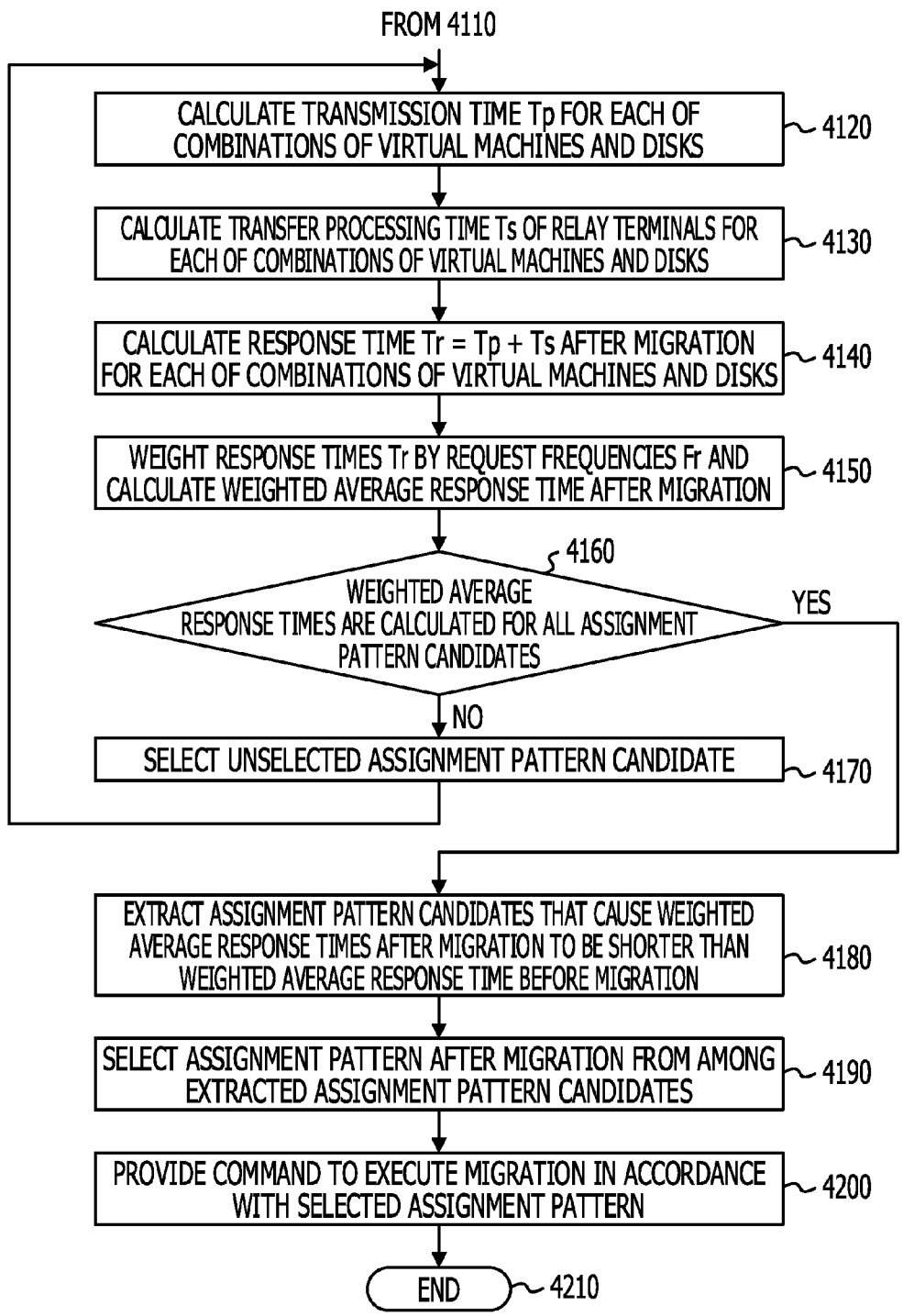

FIG. 10 illustrates an example of the process that is executed by the control computer according to the embodiment. As illustrated in FIG. 10, when a migration request is set, the control computer 600 executes a process 4000 of starting a process of selecting a data center to which a virtual machine and a disk are migrated. FIG. 10 illustrates the example in which a service is provided to the client 800 by the virtual machines 101 to 103 executed in the data center 100 illustrated in FIG. 1 and the disks 111 and 112 accessed by the virtual machines 101 to 103, and the request to migrate the virtual machines 101 to 103 and the disks 111 and 112 is set in order to provide the service to the client 800 with a lower delay.

The specifying unit 3100 executes a process 4010 of specifying, based on the migration request, virtual machines to be migrated and disks to be migrated. In the process 4010, the specifying unit 3100 specifies, based on the migration request, the virtual machines 101 to 103 and the disks 111 and 112 as the virtual machines to be migrated and the disks to be migrated.

The acquirer 3110 executes a process 4020 of acquiring information of use of resources of the data centers. In the process 4020, the information of the use of the resources of the data centers 100 to 400 is acquired and stored in the memory 3020.

FIG. 11 illustrates an example of the information of the use of the resources of the data centers. FIG. 11 illustrates the numbers of virtual machines and disks that may be assigned to the data centers 100 to 400 illustrated in FIG. 1 and the numbers of virtual machines and disks that are already assigned to the data centers 100 to 400. In the example illustrated in FIG. 11, the number of virtual machines that may be assigned to each of the data centers 100 to 400 is "3", and the number of disks that may be assigned to each of the data centers 100 to 400 is "3". In the example illustrated in FIG. 11, the information, acquired by the process 4020, of the use of the resources indicates that the number of virtual machines that are already assigned to and used in the data center 200 is "2" while the number of virtual machines that may be assigned to the data center 200 is "3". In addition, the information indicates that the number of disks that are already assigned to and used in the data center 200 is "1" while the number of disks that may be assigned to the data center 200 is "3". Specifically, "1" virtual machine and "2" disks are available in the data center 200 as resources that may be assigned to the data center 200.

The control computer 600 may make an inquiry to the data centers 100 to 400 about the information of the use of the resources in the process 4020. The data centers 100 to 400 may periodically inform the control computer 600 of the information of the use of the resources of the data centers 100 to 400 in the process 4020. If a management server that is included in the control computer 600 and management servers that are included in the data centers 100 to 400 manage the virtual machines, the virtual machines may acquire and use the information of the use of the resources in accordance with management information that is updated when a virtual machine is assigned, moved, or deleted.

As illustrated in FIG. 10, the acquirer 3100 executes a process 4030 of acquiring information on a request frequency Fr corresponding to each of combinations of the virtual machines and disks specified by the process 4010. An example of the information on the request frequencies Fr is the information illustrated in FIG. 6. The control computer 600 executes the process 4030 so as to acquire the request frequencies Fr from data centers including the virtual machines and disks specified by the process 4010 and stores the request frequencies Fr in the memory 3020.

The acquirer 3110 executes a process 4040 of acquiring information on the access frequency Fa for each of the combinations of the virtual machines and disks specified by the process 4010. An example of the information on the access frequencies Fa is the information illustrated in FIG. 7. The control computer 600 executes the process 4040 so as to acquire the access frequencies Fa from the data centers including the virtual machines and disks specified by the process 4010 and stores the access frequencies Fa in the memory 3020.

The acquirer 3110 executes a process 4050 of acquiring information on the link usage rates of the communication paths included in the network. The acquirer 3110 executes the process 4050 so as to acquire the link usage rates L710 to L780 of the communication paths 710 to 780 between the data centers and relay devices and between the relay devices, and causes the acquired link usage rates L710 to L780 to be stored in the memory 3020.

FIG. 12 illustrates an example of link usage rates of communication paths included in the network. It is assumed that the link usage rates acquired in the process 4050 are not substantially affected before and after the migration and that steady traffic is dominant. As illustrated in FIG. 12, the link usage rate L710 of the communication path 710 is 20%, for example. Since the link usage rates are information that changes over time, the control computer 600 periodically collects the link usage rates from the relay devices 500 to 530. The relay devices 500 to 530 calculate the amounts of data transferred through the communication paths based on changes between the amounts of data input to output buffers of the relay devices 500 to 530 and the amounts of data output from the output buffers of the relay devices 500 to 530, and inform the control computer 600 of the link usage rates based on the amounts of data transmitted per unit of time.

As illustrated in FIG. 10, the acquirer 3110 executes a process 4060 of acquiring information on distances to the data centers. The acquirer 3110 executes the process 4060 so as to acquire the information on the distances between the client 800 illustrated in FIG. 1 and the data centers 100 to 400 and causes the acquired information to be stored in the memory 3020. The information on the distances may be acquired and stored in the memory 3020 regardless of the order illustrated in FIG. 10.

FIG. 13 illustrates an example of the information on the distances to data centers. For example, the information acquired in the process 4060 indicates that the distance between the client 800 and the data center 100 is "500 km".

As illustrated in FIG. 10, the calculator 3120 executes a process 4070 of calculating a response time Tf before the migration for each of the combinations of the virtual machines and disks specified by the process 4010. In this case, a state before the migration is a state in which the virtual machines 101 to 103 illustrated in FIG. 1 and the disks 111 and 112 are assigned to the data center 100, and the response time Tf from the time when the client 800 transmits the request to execute the process to the time when the client 800 receives a result of the process corresponds to the response time "T1" illustrated in FIG. 2A. As described above, the amount of the data of the request by the client 800 to execute the process and the amount of the data of the process result returned to the client 800 are smaller than the amount of data that is communicated in the data center 100. The response time Tf more substantially depends on the transmission time between the data center and the client and the transmission time between the data centers than the times for access between the virtual machines 101 to 103 and the disks 111 and 112 and the transfer processing times of the relay devices.

In the process 4070, if optical fibers are used for the communication paths 710 to 780 illustrated in FIG. 1, the calculator 3120 determines, based on the information stored in the memory 3020 and indicating the distances illustrated in FIG. 13, that a distance of two-way transmission for a request by the client 800 to execute a process that uses the virtual machine 101 and the disk 111 is "1000 km", calculates a transmission time of "5.0 ms" based on a set transmission rate of 0.5 ms/100 km in the optical fibers, and causes the calculated transmission time to be stored as the response time Tf in the memory 3020. Since the virtual machines 101 to 103 and the disks 111 and 112 are available in the data center 100 before the migration, the response time Tf calculated by the calculator 3120 is "5.0 ms" and substantially depends on the aforementioned transmission time regardless of any combination of the virtual machines and disks.

FIG. 14 illustrates an example of response times before the migration. The response times Tf that are calculated by the process 4070 for the combinations of the virtual machines and the disks before the migration are assumed to be "5.0 ms" and are stored in the memory 3020.

As illustrated in FIG. 10, the calculator 3120 executes a process 4080 of weighting the response times Tf by the request frequencies Fr and calculating a weighted average response time before the migration. In the process 4080, the calculator 3120 weights the response times Tf calculated by the process 4070 by the request frequencies Fr calculated by the process 2400 illustrated in FIG. 5 and calculates the weighted average response time before the migration by calculating the average of the weighted response times. If the response times Tf before the migration are the values illustrated in the example of FIG. 14, and the request frequencies Fr are the values illustrated in the example of FIG. 6, the weighted average response time before the migration is "5.0 ms". The processes 4070 and 4080 may be executed before the start of the process illustrated in FIG. 10.

As illustrated in FIG. 10, the first selector 3130 executes a process 4090 of selecting assignment pattern candidates after the migration for the virtual machines and disks specified by the process 4010. In the process 4090, the first selector 3130 reads the distance information illustrated in FIG. 13 from the memory 3020 in order to select data centers to which the three virtual machines 101 to 103 and two disks 111 and 112 that are used by the client 800 illustrated in FIG. 1 are migrated and determines that the data center 400 is closest to the client 800 among the data centers 100 to 400 and that the distance between the client 800 and each of the data centers 100 to 300 increases in order of the distance to the data center 100, the distance to the data center 300, and the distance to the data center 200. Then, the first selector 3130 determines an available resource of the data center 400 located closest to the client 800 based on the information stored in the memory 3020 and indicating the use of the resources. In this example, since the one virtual machine and the two disks are already assigned as illustrated in FIG. 11, the first selector 3130 determines that two virtual machines and one disk are available resources in the process 4090.

In the process 4090, the first selector 3130 selects, based on the access frequencies Fa acquired by the process 4040, a combination of a virtual machine and a disk that cause the access frequency Fa to be large. For example, when the access frequencies Fa are the values illustrated in the example of FIG. 7, the first selector 3130 compares the access frequencies Fa of the combinations of the virtual machines and the disks with each other and thereby determines that the access frequency Fa of the combination of the virtual machine 101 and the disk 111 and the access frequency Fa of the combination of the virtual machine 102 and the disk 111 are relatively large. As described with reference to FIG. 2, if a virtual machine accesses a disk through the network, the time Tf for the response to the client is long. In the process 4090, therefore, the first selector 3130 determines that it is effective to assign the virtual machines 101 and 102 and the disk 111 in the same data center, especially, in the data center 400 located closest to the client 800. Since the first selector 3130 determines, based on the usage states of the resources, that the two virtual machines and the one disk are the available resources in the data center 400, the first selector 3130 determines that an assignment pattern in which the virtual machines 101 and 102 and the disk 111 are migrated to the data center 400 is an assignment pattern candidate in the process 4090.

The first selector 3130 determines, as a candidate based on the resource usage information illustrated in FIG. 11 and the distance information illustrated in FIG. 13, an assignment pattern in which the virtual machine 103 and the disk 112, which are to be migrated to a data center that has yet to be determined, are migrated to the data center 200 that is second closest to the client 800 after the data center 400. Specifically, in the process 4090, the first selector 3130 selects, as a first candidate, an assignment pattern that causes the virtual machines 101 and 102 and the disk 111 to be migrated to the data center 400 and causes the virtual machine 103 and the disk 112 to the data center 200.

The difference between the distance to the data center 200 and the distance to the data center 300 is "50 km". Thus, in the process 4090, if the difference between the distances is smaller than a certain threshold, the first selector 3130 may determine, as another candidate, an assignment pattern in which the virtual machine 103 and the disk 112 are migrated to the data center 300. Specifically, in the process 4090, the first selector 3130 selects, as a second candidate, an assignment pattern that causes the virtual machines 101 and 102 and the disk 111 to be migrated to the data center 400 and causes the virtual machine 103 and the disk 112 to be migrated to the data center 300.

As the results of the process 4090, the first and second assignment pattern candidates are selected. The first selector 3130 may select an assignment pattern in which a virtual machine and disk of which the request frequency Fr is large or of which the request frequency Fr and the access frequency Fa are large are assigned to a data center located close to the client. This is due to the fact that the usability for the client is improved by executing the migration so as to reduce a response time of a process that is frequently requested.

FIGS. 15A and 15B illustrate examples of assignment pattern candidates after the migration. FIG. 15A illustrates the first candidate among the assignment pattern candidates selected by the process 4090. The first assignment pattern candidate illustrated in FIG. 15A is information associated with a relationship in which the virtual machines 101 and 102 and the disk 111 are migrated to the data center 400 and the virtual machine 103 and the disk 112 are migrated to the data center 200.

FIG. 15B illustrates the second candidate among the assignment pattern candidates selected by the process 4090. The second assignment pattern candidate illustrated in FIG. 15B is information associated with a relationship in which the virtual machines 101 and 102 and the disk 111 are migrated to the data center 400 and the virtual machine 103 and the disk 112 are migrated to the data center 300. The information illustrated in FIGS. 15A and 15B is stored in the memory 3020.

As illustrated in FIG. 10, the calculator 3120 executes a process 4100 of calculating, based on the distance information acquired by the process 4060, the transmission times between the sites related to the assignment pattern candidates selected by the process 4090. The sites are the data centers, the relay devices, the client, and the like and are devices and systems that are located on the communication paths.

In the process 4100, distances between the sites are calculated on the distance information acquired by the process 4060. For example, the distance between the data centers 200 and 400 is calculated by subtracting the distance between the client 800 and the data center 400 from the distance between the client 800 and the data center 200. The distance between the data centers 200 and 300 is calculated by adding the distance between the data centers 200 and 400 to the distance between the data centers 300 and 400. If the communication paths between the sites are optical fibers, a transmission rate of 0.5 ms/100 km is set as a transmission rate of the optical fibers, and the transmission times between the sites are calculated from the calculated distances between the sites in the process 4100. In the process 4100, the transmission times between sites that are not related to the assignment pattern candidates selected by the process 4090 may be calculated.

FIGS. 16A and 16B illustrate examples of transmission times between sites included in the network. As illustrated in FIG. 16A, information that indicates that the transmission time between the client 800 and the data center 400 is "2.0 ms" is associated as the transmission time calculated by the process 4100 between the sites. As illustrated in FIG. 16B, information that indicates that the transmission time between the data centers 300 and 400 is "2.0 ms" is associated as the transmission time calculated by the process 4100 between the sites. The transmission times illustrated in FIGS. 16A and 16B are information that indicates the times for two-way transmission between the sites and is stored in the memory 3020.

As illustrated in FIG. 10, the second selector 3140 executes a process 4110 of selecting one of the assignment pattern candidates selected by the process 4090. It is assumed that the second assignment pattern candidate illustrated in FIG. 15B is selected, and subsequent processes are described below.

The calculator 3120 executes a process 4120 of calculating a transmission time Tp for each of combinations of the virtual machines and the disks for the second assignment pattern candidate selected by the process 4110. A detailed example of the process 4120 is illustrated in FIG. 17 and described below with reference to FIG. 17.

FIG. 17 illustrates the other example of the process that is executed by the control computer according to the embodiment. The process illustrated in FIG. 17 is a detailed example of the process 4120 illustrated in FIG. 10. When one of the assignment pattern candidates is selected by the process 4110, the process illustrated in FIG. 17 is started by a process 5000.

The second selector 3140 executes a process 5010 of selecting one of the combinations of the virtual machines and disks of the selected assignment pattern candidate. Then, the calculator 3120 executes a process 5020 of calculating a transmission time Ta between the client and a data center to which the virtual machine selected by the process 5010 is assigned.

For example, if the combination, selected by the process 5010, of the virtual machine and the disk are the virtual machine 101 and the disk 111, the transmission time Ta between the client 800 and the data center to which the virtual machine 101 is assigned is calculated by the process 5020. Since it is assumed that the second assignment pattern candidate illustrated in FIG. 15B is selected in the process illustrated in FIG. 17 as described above, the virtual machine 101 is assigned to the data center 400. Specifically, in the process 5020, the information illustrated in FIGS. 16A and 16B on the transmission times is read from the memory 3020, the transmission time Ta is calculated to be "2.0 ms". This is due to the fact that the transmission time between the client 800 and the data center 400 is "2.0 ms". If the combination, selected by the process 5010, of the virtual machine and the disk is the virtual machine 103 and the disk 111, the transmission time Ta between the client 800 and a data center to which the virtual machine 103 is assigned is calculated by the process 5020. Since it is assumed that the second assignment pattern candidate illustrated in FIG. 15B is selected, the virtual machine 103 is assigned to the data center 300. In the process 5020, the information illustrated in FIGS. 16A and 16B on the transmission times is read from the memory 3020, and the transmission time Ta is calculated to be "4.0 ms". This is due to the fact that the transmission time between the client 800 and the data center 300 is "4.0 ms".

The determining unit 3150 executes a process 5030 of determining whether or not the selected virtual machine and the selected disk are assigned to the same data center for the selected assignment pattern candidate. As described above, it is assumed that the second assignment pattern candidate illustrated in FIG. 15B is selected. Thus, if the combination, selected by the process 5010, of the virtual machine and the disk is the virtual machine 101 and the disk 111, the virtual machine 101 and the disk 111 are assigned to the data center 400 in the process 5030. Then, the process illustrated in FIG. 17 proceeds to a process 5040.

The calculator 3120 executes the process 5040 of calculating a transmission time Tp=Ta corresponding to the selected combination of the virtual machine and the disk. The reason why the transmission time Tp is equal to the transmission time Ta in the process 5040 is that since the virtual machine and the disk are assigned to the same data center, a time for access between the virtual machine and the disk may be ignored with respect to the time for transmission in the network.

As described above, the second assignment pattern candidate illustrated in FIG. 15B is selected. Thus, if the combination, selected by the process 5010, of the virtual machine and the disk is the virtual machine 103 and the disk 111, the virtual machine 103 is assigned to the data center 300, and the disk 111 is assigned to the data center 400. It is determined that the virtual machine 103 and the disk 111 are not assigned to the same data center in the process 5030, and the process illustrated in FIG. 17 proceeds to a process 5050. In this case, since the virtual machine and the disk are assigned to the different data centers, and the virtual machine accesses the disk through the network, the process 5050 is executed in order to calculate the transmission time based on the access frequency.

The calculator 3120 executes the process 5050 of calculating a transmission time Tb between the selected virtual machine and the selected disk. It is assumed that the combination, selected by the process 5010, of the virtual machine and the disk is the virtual machine 103 and the disk 111. Since the second assignment pattern candidate illustrated in FIG. 15B is selected, the virtual machine 103 is assigned to the data center 300, and the disk 111 is assigned to the data center 400. Specifically, since the virtual machine 103 accesses the disk 111 between the data centers 300 and 400, the time for the two-way access between the virtual machine 103 and the disk 111 is calculated to be "2.0 ms" based on the information illustrated in FIG. 16B. Regarding the access frequencies Fa acquired by the process 4040 illustrated in FIG. 10, since the virtual machine 103 accesses the disk 111 once within the time period from the time when the process requested by the client 800 is executed to the time when the result of the process is returned to the client 800 as illustrated in FIG. 7, the total time for the transmission between the virtual machine 103 and the disk 111 is calculated to be "2.0 ms"×1="2.0 ms" by the process 5050. A transmission time between a virtual machine and a disk that are assigned to different data centers may be precisely estimated by the process 5050.

The calculator 3120 executes a process 5060 of calculating the transmission time Tp=Ta+Tb corresponding to the selected combination of the virtual machine and the disk. If the combination, selected by the process 5010, of the virtual machine and the disk are the virtual machine 103 and the disk 111, the transmission time Tp is calculated to be "4.0 ms" by the process 5060. This is due to the fact that the transmission time Ta is calculated to be "2.0 ms" by the process 5020 and the transmission time Tb is calculated to be "2.0 ms" by the process 5050. Information on the transmission times Tp calculated by the processes 5040 and 5060 is associated with the combination of the virtual machine and the disk and stored in the memory 3020.

The determining unit 3150 executes a process 5070 of determining whether or not a transmission time Tp is calculated for each of all combinations of the selected virtual machines and the selected disks. If the determining unit 3150 determines that a transmission time Tp has yet to be calculated for at least one of the combinations, the process proceeds to a process 5080. In the process 5080, another unselected combination of a virtual machine and a disk is selected. Then, the process returns to the process 5020. If the determining unit 3150 determines that the transmission times Tp are calculated for all the combinations in the process 5070, the process illustrated in FIG. 17 proceeds to a process 5090, is thereby terminated, and proceeds to a process 4130 illustrated in FIG. 10.

When the process illustrated in FIG. 17 is terminated, the calculator 3120 executes the process 4130 of calculating a transmission time Ts for each of the combinations of the virtual machines and disks of the assignment pattern candidate selected in the process 4110 illustrated in FIG. 10. A detailed example of the process 4130 is illustrated in FIG. 18 and described below with reference to FIG. 18.

Figure 18:
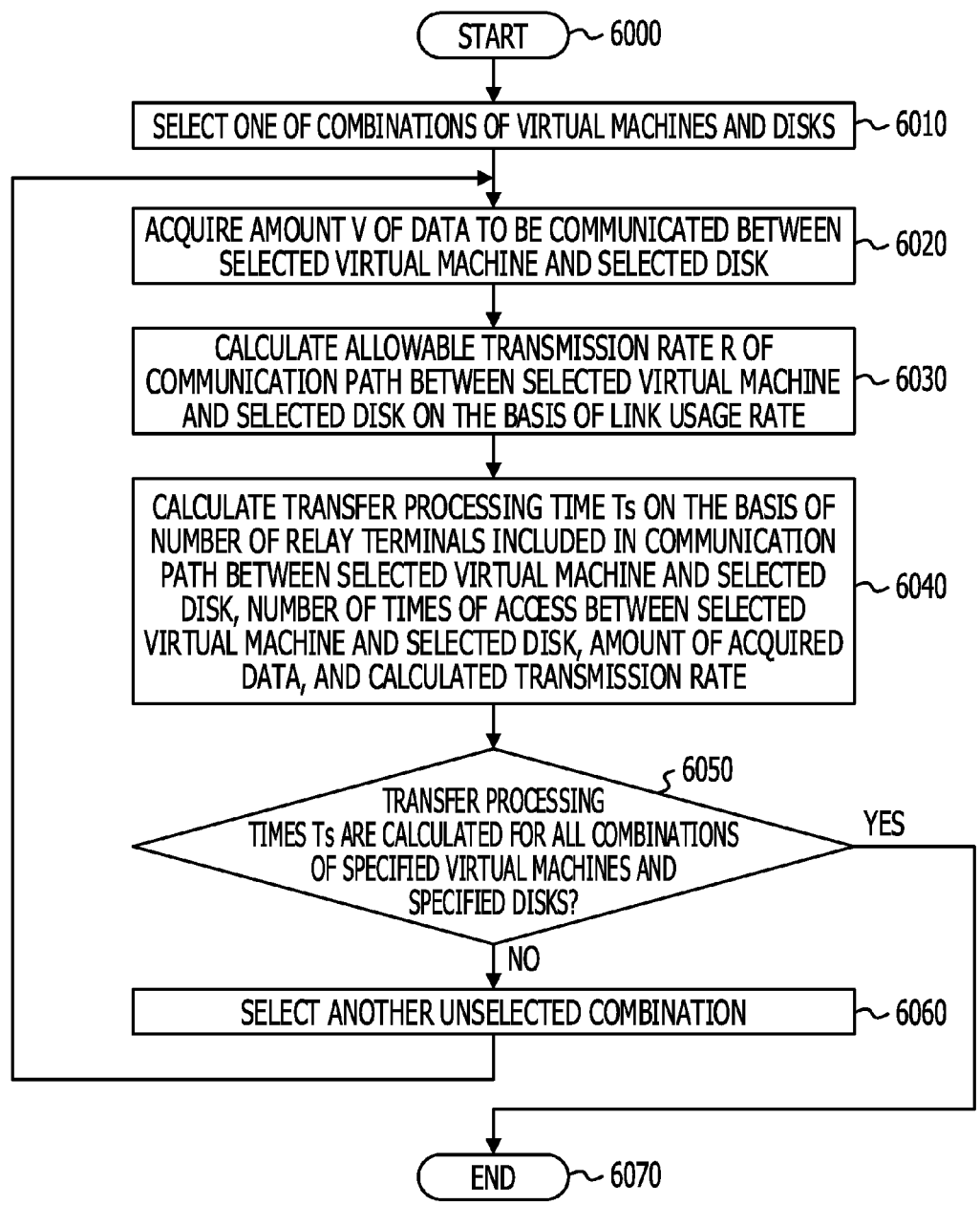
FIG. 18 illustrates another example of the process that is executed by the control computer according to the embodiment.

FIG. 18 illustrates the other example of the process that is executed by the control computer according to the embodiment. The process illustrated in FIG. 18 is the detailed example of the process 4130 illustrated in FIG. 10. When the process 4120 is terminated, the process illustrated in FIG. 18 is started by a process 6000. The second selector 3140 executes a process 6010 of selecting one of the combinations of the virtual machines and disks of the assignment pattern candidate selected by the process 4110.

The acquirer 3110 executes a process 6020 of acquiring the amount V of data that is communicated between the virtual machine and disk selected by the process 6010. An association of a destination address included in the header of a packet received by a virtual machine with a disk to be accessed by the virtual machine in a post-process is managed in each of the data centers 100 to 400, and the amount V of data communicated between the virtual machine and the disk is monitored and stored in a log in each of the data centers 100 to 400. Thus, the amount V of the data that is communicated between the selected virtual machine and disk is acquired based on the log in the process 6020.

The calculator 3120 executes a process 6030 of calculating an allowable transmission rate R of a communication path between the virtual machine and disk selected by the process 6010 based on the link usage rate. It is assumed that the second assignment pattern candidate illustrated in FIG. 15B is selected and the process illustrated in FIG. 18 is executed. In addition, it is assumed that the virtual machine and disk selected by the process 6010 are the virtual machine 101 and the disk 112. Specifically, it is assumed that the virtual machine 101 is assigned to the data center 400 and the disk 112 is assigned to the data center 300.

In the process 6030, the calculator 3120 determines, based on information of the configuration of the network, that a communication path between the virtual machine 101 assigned to the data center 400 and the disk 112 assigned to the data center 300 is composed of the communication paths 740, 780, and 730. In the process 6030, the calculator 3120 reads the link usage rates illustrated in FIG. 12 from the memory 3020 and thereby determines that the link usage rate associated with the communication path 740 is "40%", the link usage rate associated with the communication path 780 is "60%", and the usage rate associated with the communication path 730 is "50%". As described above with reference to FIG. 2A, the link usage rates are the ratios of bands used for the communication paths to the maximum bands of the communication paths. In this example, all the bands of the communication paths illustrated in FIG. 1 are 10 Gbps.

For the communication through the plurality of communication paths 740, 780, and 730, the transmission rate R is determined based on the link usage rate of a communication path in which the amount of traffic is largest. This is due to the fact that even if the band of another communication path among the plurality of communication paths is available, data is not transmitted since the amount of the traffic is large in the communication path of which the link usage rate is relatively high. In this case, the data is buffered in at least one of the relay devices. If the amount of the data to be buffered exceeds the capacity of the buffering, feedback is executed so as not to output the data, and the communication is executed based on the band of the communication path in which the amount of the traffic is largest and of which the link usage rate is relatively high. As described above, if the link usage rate associated with the communication path 740 is "40%", the link usage rate associated with the communication path 780 is "60%", the usage rate associated with the communication path 730 is "50%", and the band of the communication path 740 is relatively available for data transfer, data waits to be transferred to the communication path 780, and the transmission rate R of the communication through the a plurality of communication paths 740, 780, and 730 depends on the highest link usage rate of "60%". In the example, therefore, the allowable transmission rate R is calculated to be 10 Gbps× (100%−60%)=4 Gbps in the process 6030.

The calculator 3120 executes a process 6040 of calculating the transfer processing time Ts based on the number of relay devices included in the communication path between the virtual machine and disk selected by the process 6010, the number of times of access between the virtual machine and disk selected by the process 6010, the data amount V acquired by the process 6020, and the transmission rate R calculated by the process 6030. It is assumed that the second assignment pattern candidate illustrated in FIG. 15B is selected and the process illustrated in FIG. 18 is executed. In addition, it is assumed that the virtual machine and disk selected by the process 6010 are the virtual machine 101 and the disk 112. Specifically, it is assumed that the virtual machine 101 is assigned to the data center 400 and the disk 112 is assigned to the data center 300.

In the process 6040, the calculator 3120 determines that the two relay devices 520 and 530 exist on the communication path between the virtual machine 101 assigned to the data center 400 and the disk 112 assigned to the data center 300. In the process 6040, the calculator 3120 reads the information illustrated in FIG. 7 and thereby determines, based on the access frequencies Fa acquired by the process 4040 illustrated in FIG. 10 that the virtual machine 101 accesses the disk 111 three times within the time period from the time when the process requested by the client 800 is executed to the time when the result of the process is returned to the client 800. For the combination of the virtual machine 101 and the disk 111, data passes through the relay devices 520 and 530 four times (2×2=4) for one time of the two-way access between the virtual machine 101 and the disk 111. Thus, data passes through the relay devices 520 and 530 twelve times (4×3=12) for three times of the access within the time period from the time when the process requested by the client 800 is executed to the time when the result of the process is returned to the client 800.

It is assumed that the data amount V acquired by the process 6020 for the combination of the virtual machine 101 and the disk 111 is "5 Mbytes". The transmission rate R calculated by the process 6030 for the combination of the virtual machine 101 and the disk 111 is "4 Gbps" as described above. Thus, in the process 6040, the equation of V (Mbytes)×8/R (Gbps)×12 (times)=5 Mbytes×8/4 Gbps×12=1.2 ms is calculated, and whereby the transfer processing time Ts for the combination of the virtual machine 101 and the disk 111 is calculated to be "1.2 ms". Information on the transfer processing time Ts calculated by the process 6040 is associated with the combination of the virtual machine and the disk and stored in the memory 3020.

The determining unit 3150 executes a process 6050 of determining whether or not the transfer processing times Ts are calculated for all the combinations of the specified virtual machines and the specified disks. If the transfer processing time Ts has yet to be calculated for any of the combinations, the process proceeds to a process 6060 of selecting another unselected combination of a virtual machine and a disk. Then, the process 6060 is executed and the process returns to the process 6020. If the determining unit 3150 determines that the transfer processing times Ts are calculated for all the combinations in the process 6050, the process illustrated in FIG. 18 proceeds to a process 6070, is thereby terminated, and proceeds to a process 4140 illustrated in FIG. 10.

As illustrated in FIG. 10, the calculator 3120 executes the process 4140 of calculating a response time Tr=Tp+Ts after the migration for each of the combinations of the virtual machines and disks of the assignment pattern candidate selected by the process 4110. In the process 4140, the calculator 3120 reads, from the memory 3020, the transmission times Tp calculated by the process 4120 and stored in the memory 3020 and the transfer processing times Ts calculated by the process 4130 and stored in the memory 3020, adds the transmission times Tp to the transfer processing times Ts, and thereby calculates the response time Tr for each of the combinations of the virtual machines and the disks. In the process 4140, the calculator 3120 calculates, for each of the combinations, the response times Tr based on the times for data transfer executed in the network within the time period from the time when the client transmits the request to execute the process to the time when the result of the process is returned to the client, the transfer processing times of the relay devices, and the frequency of access by the virtual machine to the disk, regardless of whether the virtual machine and the disk are assigned to the same data center or to different data centers. The calculated response times Tr are associated with the combinations of the virtual machines and the disks and stored in the memory 3020.

FIGS. 19A and 19B illustrate examples of the response times Tr for the assignment pattern candidates after the migration. Information illustrated in FIGS. 19A and 19B indicates the response times Tr calculated by the process 4140 and is stored in the memory 3020. The information illustrated in FIG. 19A corresponds to the assignment pattern illustrated in FIG. 15A, while the information illustrated in FIG. 19B corresponds to the assignment pattern illustrated in FIG. 15B.

Referring to FIGS. 15A and 19A, the information illustrated in FIG. 19A indicates that when the client 800 transmits a request to a process that uses the virtual machine 101 and disk 111 migrated to the data center 400, the response time to the time when the client 800 receives a result of the process is "2.0 ms". In addition, the information illustrated in FIG. 19A indicates that when the client 800 transmits a request to a process that uses the virtual machine 103 and disk 112 migrated to the data center 200, the response time to the time when the client 800 receives a result of the process is "3.5 ms". Furthermore, the information illustrated in FIG. 19A indicates that when the client 800 transmits a request to a process that uses the virtual machine 103 migrated to the data center 200 and the disk 111 migrated to the data center 400, the response time to the time when the client 800 receives a result of the process is "11.3 ms". It is apparent that the response time of "3.5 ms" that corresponds to the combination of the virtual machine 103 and disk 112 both migrated to the data center 200 is estimated to be longer than the response time of "2.0 ms" that corresponds to the combination of the virtual machine 101 and disk 111 both migrated to the data center 400 located close to the client 800. It is also apparent that the response time of "11.3 ms" that corresponds to the combination of the virtual machine 103 and the disk 111 that are migrated to the different data centers 200 and 400 respectively is estimated to be longer than the response time of "2.0 ms" that corresponds to the combination of the virtual machine 101 and the disk 111 that are both migrated to the data center 400.

Referring to FIGS. 15B and 19B, the information illustrated in FIG. 19B indicates that when the client 800 transmits a request to execute a process that uses the virtual machine 101 and disk 111 migrated to the data center 400, the response time to the time when the client 800 receives a result of the process is "2.0 ms". In addition, the information illustrated in FIG. 19B indicates that when the client 800 transmits a request to a process that uses the virtual machine 103 and disk 112 migrated to the data center 300, the response time to the time when the client 800 receives a result of the process is "4.0 ms". Furthermore, the information illustrated in FIG. 19B indicates that when the client 800 transmits a request to a process that uses the virtual machine 103 migrated to the data center 300 and the disk 111 migrated to the data center 400, the response time to the time when the client 800 receives a result of the process is "9.2 ms". It is apparent that the response time of "4.0 ms" that corresponds to the combination of the virtual machine 103 and disk 112 both migrated to the data center 300 is estimated to be longer than the response time of "2.0 ms" that corresponds to the combination of the virtual machine 101 and disk 111 both migrated to the data center 400 located close to the client 800. It is also apparent that the response time of "9.2 ms" that corresponds to the combination of the virtual machine 103 and the disk 111 that are migrated to the different data centers 300 and 400 respectively is estimated to be longer than the response time of "2.0 ms" that corresponds to the combination of the virtual machine 101 and the disk 111 that are both migrated to the data center 400.

While the response time that corresponds to the combination of the virtual machine 103 and the disk 112 is "3.5 ms" in the information illustrated in FIG. 19A, the response time that corresponds to the combination of the virtual machine 103 and the disk 112 is "4.0 ms" in the information illustrated in FIG. 19B. Referring to FIG. 13 illustrating the distance information, the virtual machine 103 and the disk 112 are migrated to the data center 200 that is separated by a distance of "350 km" from the client 800 in the case illustrated in FIG. 19A. In the case illustrated in FIG. 19B, the virtual machine 103 and the disk 112 are migrated to the data center 300 that is separated by a distance of "400 km" from the client 800. Thus, the difference, caused by the distances from the client 800, between the transmission times Tp affects the response times Tr.

While the response time that corresponds to the combination of the virtual machine 103 and the disk 111 is "11.3 ms" in the information illustrated in FIG. 19A, the response time that corresponds to the combination of the virtual machine 103 and the disk 111 is "9.2 ms" in the information illustrated in FIG. 19B. Referring to FIG. 12 illustrating the link usage rates, the virtual machine 103 migrated to the data center 200 accesses the disk 111 migrated to the data center 400 through the communication path 770 of which the link usage rate L770 is "90%" and in which the amount of traffic is large in the case illustrated in FIG. 19A, while the virtual machine 103 migrated to the data center 300 accesses the disk 111 migrated to the data center 400 through the communication path 780 of which the link usage rate L780 is "60%" in the case illustrated in FIG. 19B. Thus, the difference between the link usage rates affects the response times Tr.

As illustrated in FIG. 10, the calculator 3120 executes a process 4150 of weighting the response times Tr by the request frequencies Fr and calculating a weighted average response time after the migration. In the process 4150, the calculator 3120 reads the response times Tr calculated by the process 4140 from the memory 3020 and weights the response times Tr by the request frequencies Fr acquired by the process 4030 for the combinations of the virtual machines and the disks. In the process 4150, the calculator 3120 calculates the average of the response times Tr weighted by the request frequencies Fr for the combinations of the virtual machines and the disks and thereby calculates the weighted average response time corresponding to the assignment pattern candidate. The calculated average of the weighted response times is used for a process 4180 described later and stored in the memory 3020.

In the example illustrated in FIG. 19A, the calculator 3120 weights the response times Tr based on the request frequencies Fr illustrated in FIG. 6 for the combinations of the virtual machines and the disks and calculates the average of the weighted response times in the process 4150, and the calculated weighted average response time is "4.6 ms".

In the example illustrated in FIG. 19B, the calculator 3120 weights the response times Tr based on the request frequencies Fr illustrated in FIG. 6 for the combinations of the virtual machines and the disks and calculates the average of the weighted response times in the process 4150, and the calculated weighted average response time is "4.1 ms".

Since the weighted average response time is calculated in the process 4150, a combination of a disk and a virtual machine for executing a process requested by the client may be considered for the response times that serve as indexes to be used to select an assignment pattern for the migration. Thus, a response time that wholly improves the service experience of the client is evaluated.

As illustrated in FIG. 10, the determining unit 3150 executes a process 4160 of determining whether or not the weighted average response time is calculated for each of all the assignment pattern candidates. If the determining unit 3150 determines that the weighted average response time has yet to be calculated for any of all the assignment pattern candidates, the process proceeds to a process 6060 and a process 4170 of selecting an unselected assignment pattern candidate is executed. Then, the process returns to the process 4120. If the determining unit 3150 determines in the process 4160 that the weighted average response time is calculated for each of all the assignment pattern candidates, the process proceeds to a process 4180.

The extractor 3160 executes the process 4180 of extracting assignment pattern candidates that cause the weighted average response times after the migration to be shorter than the weighted average response time before the migration. In the process 4180, the extractor 3160 reads the weighted average response time calculated in the process 4080 before the migration from the memory 3020. In the process 4180, the extractor 3160 reads, for the assignment pattern candidates from the memory 3020, the weighted average response times after the migration, which have been calculated in the process 4150. In the process 4180, the extractor 3160 compares the weighted average response time before the migration with the weighted average response times after the migration, and extracts the assignment pattern candidates that cause the weighted average response times after the migration to be shorter than the weighted average response time before the migration.

In the process 4180 in the aforementioned example, the weighted average response time before the migration is "5.0 ms", the weighted average response time after the migration that corresponds to the first assignment pattern candidate is "4.6 ms", and the weighted average response time after the migration that corresponds to the second assignment pattern candidate is "4.1 ms". Thus, both weighted average response time after the migration that corresponds to the first assignment pattern candidate and weighted average response time after the migration that corresponds to the second assignment pattern candidate are shorter than the weighted average response time before the migration. In the process 4180, therefore, the first and second assignment pattern candidates are extracted.

The second selector 3140 executes a process 4190 of selecting an assignment pattern after the migration from among the assignment pattern candidates extracted in the process 4180. In the process 4190, the second selector 3140 selects, as the assignment pattern after the migration from among the assignment pattern candidates extracted in the process 4180, an assignment pattern candidate that causes the weighted average response time to be short in order to improve the service experience of the client. In the aforementioned example, the first assignment pattern candidate that causes the weighted average response time to be "4.6 ms" and the second assignment pattern candidate that causes the weighted average response time to be "4.1 ms" are extracted by the process 4180, and the second assignment pattern candidate that the weighted average response time to be shorter is selected as the assignment pattern after the migration in the process 4190.

The commander 3170 executes a process 4200 of providing a command to execute the migration in accordance with the assignment pattern selected in the process 4190. In the process 4200, the control computer 600 transmits the command to execute the migration in accordance with the assignment pattern selected by the process 4190 to the data centers related to the migration. In the aforementioned example, the control computer 600 transmits a command to execute the migration in accordance with the second assignment pattern candidate to the data centers 100, 300, and 400 related to the migration. After that, the process illustrated in FIG. 10 is terminated.

According to the embodiment, when a virtual machine and a storage device are to be assigned to a plurality of data centers, a response delay time to the time when a process result is returned to a user may be reduced by selecting a combination of data centers that reduce the response time that depends on the frequency of access to the storage device. The embodiment describes a plurality of data centers as the example. The embodiment is applicable to the case where a virtual machine and a storage device are assigned to a plurality of servers coupled to each other through a relay device or coupled to each other through a relay device in a single data center.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An migration method of a virtual machine and a storage region on a plurality of computers coupled to each other through a relay device, each of the plurality of computers includes a processor and a memory device, the method comprising
   counting a first number of requests received by the virtual machine in a certain period, the virtual machine executing data processing in response to the requests;
   counting a second number of accesses to the storage region by the virtual machine in a certain period;
   calculating a first value by dividing the first number by the second number;
   selecting a first processor among the processors included in the plurality of computers, and selecting a second memory device among the memory devices included in the plurality of computers;
   when assuming that the virtual machine is to be assigned to the first processor and the storage region is to be assigned to the first memory device respectively, based on the first value, calculating a first response time of the virtual machine for at least one of the requests; and
   based on the first response time, determining whether to execute a migration of the virtual machine and the storage region to the first processor and to the first memory device respectively.

2. The migration method according to claim 1, further comprising:
   calculating a second response time of the virtual machine for at least one of the requests on condition that the virtual machine is assigned to a second processor included in the plurality of computers and the storage region is assigned to a second memory device included in the plurality of computers; and
   executing a migration of the virtual machine and the storage region to the first processor and to the first memory device when the first response time is shorter than the second response time.

3. The migration method according to claim 2, wherein the first response time is calculated based on a transmission time when the virtual machine accesses the storage device through the relay device.

4. The migration method according to claim 2, wherein the first response time is calculated based on a transfer processing time of the relay device when the virtual machine accesses the storage device through the relay device.

5. The migration method according to claim 4, wherein the transfer processing time is calculated based on a bandwidth of a communication path that is one of a plurality of communication paths divided by the relay device in a network and of which a band usage rate is highest.

6. The migration method according to claim 2, wherein when at least one of a number of virtual machines and a number of storage devices is two or more, a combination of a virtual machine and a storage device from among the virtual machines and the storage devices that causes the first value to be largest are allocated to a same computer.

7. The migration method according to claim 1, further comprising:
   selecting a plurality of candidates for a combination of the computers when at least one of a number of virtual machines and a number of storage devices is two or more;
   weighting response times of a candidate combination of the computers by the first value of the request for process to cause the virtual machine to execute the process; and
   selecting a combination of the computers from among the candidate combinations of the computers based on the weighted response times.

8. The migration method according to claim 7, further comprising:
   calculating an average response time for a weighted response time; and
   selecting, as the combination of the computers from among the candidate combinations of the computers, a candidate combination of the computers that causes the average response time to be shortest among the calculated average response times.

9. The migration method according to claim 1, wherein identification information that identifies a source of the request is associated with the virtual machine and the storage device.

10. An information processing device configured to communicationally couple to a plurality information processing devices and cause migration of a virtual machine and a storage region on the plurality of the information processing devices, each of the plurality of information processing devices includes a processor and a memory device, the information processing device comprising
    a memory configured to store a program; and
    a processor, based on the program, configured tot:
      counting a first number of requests received by the virtual machine in a certain period, the virtual machine executing data processing in response to the requests;
      counting a second number of accesses to the storage region by the virtual machine in a certain period;
      calculating a first value by dividing the first number by the second number;
      selecting a first processor among the processors included in the plurality of information processing devices, and selecting a second memory device among the memory devices included in the plurality of information processing devices;
      when assuming that the virtual machine is to be assigned to the first processor and the storage region is to be assigned to the first memory device respectively, based on the first value, calculating a first response time of the virtual machine for at least one of the requests; and
      based on the first response time, determining whether to execute a migration of the virtual machine and the storage region to the first processor and to the first memory device respectively.

11. A non-transitory computer-readable recording medium having stored therein a program for causing an information processing device, which is configured to communicationally couple to a plurality information processing devices and cause migration of a virtual machine and a storage region on the plurality of the information processing devices, each of the plurality of information processing devices includes a processor and a memory device, to execute an information process comprising:
- counting a first number of requests received by the virtual machine in a certain period, the virtual machine executing data processing in response to the requests;
- counting a second number of accesses to the storage region by the virtual machine in a certain period;
- calculating a first value by dividing the first number by the second number;
- selecting a first processor among the processors included in the plurality of information processing devices, and selecting a second memory device among the memory devices included in the information processing devices;
- when assuming that the virtual machine is to be assigned to the first processor and the storage region is to be assigned to the first memory device respectively, based on the first value, calculating a first response time of the virtual machine for at least one of the requests; and
- based on the first response time, determining whether to execute a migration of the virtual machine and the storage region to the first processor and to the first memory device respectively.

* * * * *